(12) United States Patent
Herrera et al.

(10) Patent No.: US 8,820,477 B1
(45) Date of Patent: Sep. 2, 2014

(54) ACOUSTIC PANEL

(71) Applicant: The Boeing Company, Chicago, IL (US)

(72) Inventors: Eric Herrera, Mukilteo, WA (US); Eric H. Nesbitt, Duvall, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/953,287

(22) Filed: Jul. 29, 2013

(51) Int. Cl.
*E04B 1/82* (2006.01)

(52) U.S. Cl.
USPC .......................................... 181/292; 181/284

(58) Field of Classification Search
CPC ................ E04B 1/86; G10K 11/172
USPC ................................................ 181/292, 284
See application file for complete search history.

(56) References Cited

U.S. PATENT DOCUMENTS

| | | | |
|---|---|---|---|
| 3,700,067 A | 10/1972 | Dobbs et al. | |
| 3,831,710 A | 8/1974 | Wirt | |
| 4,235,303 A | 11/1980 | Dhoore et al. | |
| 4,248,647 A * | 2/1981 | Herron et al. | 156/84 |
| 4,257,998 A | 3/1981 | Diepenbrock, Jr. et al. | |
| 4,265,955 A * | 5/1981 | Harp et al. | 428/116 |
| 4,384,020 A | 5/1983 | Beggs et al. | |
| 4,452,335 A | 6/1984 | Mathews et al. | |
| 4,465,725 A | 8/1984 | Riel | |
| 4,671,841 A * | 6/1987 | Stephens | 156/292 |
| 5,041,323 A | 8/1991 | Rose et al. | |
| 5,175,401 A * | 12/1992 | Arcas et al. | 181/292 |
| 5,543,198 A * | 8/1996 | Wilson | 428/116 |
| 6,114,652 A | 9/2000 | Clarke et al. | |
| 6,182,787 B1 * | 2/2001 | Kraft et al. | 181/292 |
| 6,509,081 B1 | 1/2003 | Diamond | |
| 6,607,625 B2 * | 8/2003 | Andre et al. | 156/169 |
| 6,767,606 B2 | 7/2004 | Jackson et al. | |
| 6,840,349 B2 * | 1/2005 | Andre et al. | 181/292 |
| 7,328,771 B2 | 2/2008 | Costa et al. | |
| 7,434,659 B2 | 10/2008 | Ayle | |
| 7,510,052 B2 | 3/2009 | Ayle | |

(Continued)

FOREIGN PATENT DOCUMENTS

| | | |
|---|---|---|
| EP | 0352993 A1 | 1/1990 |
| EP | 2472509 A1 | 7/2012 |
| GB | 2056367 A | 3/1981 |
| GB | 2122540 A | 1/1984 |

OTHER PUBLICATIONS

Liu et al., "A multiple degree of freedom electromechanical Helmholtz resonator," Acoustic Society of America, vol. 122, No. 1, Jul. 2007, pp. 291-301.

(Continued)

*Primary Examiner* — Forrest M Phillips
(74) *Attorney, Agent, or Firm* — Yee & Associates, P.C.

(57) ABSTRACT

An acoustic panel for sound attenuation employs a septumized cellular core sandwiched between a backsheet and a linear acoustic facesheet. The linear acoustic facesheet employs a linear material layer that impedes acoustic waves entering the core substantially linearly over a wide range of frequencies and sound of pressure levels.

21 Claims, 8 Drawing Sheets

(56) References Cited

U.S. PATENT DOCUMENTS

| | | |
|---|---|---|
| 7,854,298 B2 | 12/2010 | Ayle |
| 7,913,813 B1 | 3/2011 | Mathur |
| 7,921,966 B2 * | 4/2011 | Chiou et al. ............ 181/292 |
| 8,037,967 B2 | 10/2011 | Mercat |
| 8,066,098 B2 | 11/2011 | Ayle |
| 8,413,761 B2 | 4/2013 | Ayle |
| 8,511,429 B1 * | 8/2013 | Yu et al. ................ 181/290 |
| 2005/0006529 A1 | 1/2005 | Moe et al. |
| 2006/0219477 A1 | 10/2006 | Ayle |
| 2012/0037449 A1 | 2/2012 | Ayle |

OTHER PUBLICATIONS

Han, "Sound Reduction by a Helmholtz Resonator," Masters Thesis, Lehigh University, Sep. 2008, 110 pages.

"Hexweb Acousti-Cap," Hexcel Corporation, copyright 2010, 4 pages, accessed Jul. 29, 2013. http://www.hexcel.com/Resources/DataSheets/Brochure-Data-Sheets/HexWeb_Acousti-Cap.pdf.

"Purolator Acoustic Porous Metals," Purolator Advanced Filtration, copyright 2006, 3 pages, accessed Jul. 29, 2013. http://www.purolator-facet.com/acoustic.htm.

* cited by examiner

ACOUSTIC PANEL

BACKGROUND INFORMATION

1. Field

The present disclosure generally relates to acoustic treatments for controlling sound and noise, and deals more particularly with an acoustic panel fused for sound attenuation.

2. Background

High bypass type aircraft engines produce noise due to the high airflows through inlets, rotating stages and exhaust nozzles of the engines. In order to reduce noise and satisfy noise regulations governing commercial aircraft, high bypass engines may incorporate acoustic panels in various parts of the engine, such as in the inlets of engine nacelles. These acoustic panels, sometimes referred to as acoustic treatments or acoustic liners, may comprise a septumized honeycomb core sandwiched between a perforated inner skin and a non-perforated outer skin. The placement of septums in the cells of the honeycomb core form cavities that act as Helmholtz resonators which attenuate the sound/noise caused by high speed airflow into the inlets of the engine nacelles. Sound entering the cells of the core is dampened by the septum and reflected by the outer skin to partially cancel the incoming sound over a range of frequencies.

In some acoustic panels, only a septum in the core is used to dampen incoming acoustic waves, but the use of only a septum may limit the ability of the core materials to attenuate acoustic waves over a wide range of frequencies. Moreover acoustic cores that employ individual septums in core cells are time-consuming and expensive to fabricate. In other known acoustic panels, a layer of acoustic material is placed on one side of the inner skin which acts as an impedance to reduce the amplitude of acoustic waves entering the core, however the layer of acoustic material may provide acoustic wave attenuation over only a relatively narrow range of frequencies.

Accordingly, there is a need for an acoustic panel that is relatively economical to fabricate and which linearly attenuates undesired sound over a relatively wide range of frequencies.

SUMMARY

The disclosed embodiments provide an acoustic panel capable of attenuating sound over a relatively wide range of frequencies and engine operating conditions which induce a wide range of sound pressure levels. The acoustic panel employs a septumized core and a perforated, linear acoustic facesheet which respectively provide separate impedance and dampening functions. More specifically, the primary impedance function is moved toward in the flow of acoustic waves so that the flow is less energetic and allows optimization of the dampening function. The linear acoustic facesheet includes a layer of linear material that acts as an impedance layer to reduce the amplitude of sound entering the core cells, to substantially the same degree, over a relatively wide range of frequencies (bandwidth) and sound pressure levels. Principles of the disclosed embodiments may be employed in an acoustic panel having a core that is not septumized.

In embodiments employing a septumized core, the septum is perforated and functions to dampen sound that enters the core cells through the linear acoustic facesheet. Septumization of the core may be economically achieved using simple septum forming techniques. The linear acoustic facesheet may be quickly and economically fabricated using automated fiber placement equipment and out-of-autoclave processing. These processes allow acoustic panels to be economically fabricated that are tuned to respond linearly over a desired, wide range of frequencies and sound pressure levels. By adjusting the type and depth of the septum, the total depth of the panel and/or the type of linear material, the acoustic panel can be tuned to increase the range of frequencies that are effectively attenuated as well as to increase the magnitude of attenuation over a range of frequencies and sound pressure levels.

According to one disclosed embodiment, an acoustic panel is provided for attenuation of acoustic waves. The acoustic panel comprises a core having first and second sides and a plurality of cells extending between the first and second sides. The acoustic panel also includes an air-impermeable backsheet on the first side of the core. In some variations, a septum is present within the core between said first and second sides of the core. A linear acoustic facesheet on the second side of the core includes a layer of linear material that responds substantially the same to the acoustic waves over a range of acoustic wave frequencies and sound pressure levels.

According to another disclosed embodiment, an acoustic liner is provided for an aircraft engine intake to attenuate acoustic waves produced by the engine. The acoustic liner comprises a cellular core having a first side and a second side, and a backsheet covering the first side of the cellular core. A linear acoustic facesheet covers the second side of the cellular core and is exposed to acoustic waves within the engine intake. The linear acoustic facesheet includes a layer of linear material that impedes acoustic waves entering the cellular core substantially linearly over a range of acoustic wave frequencies and pressure levels.

According to still another disclosed embodiment, a method is provided of fabricating an acoustic panel for attenuating acoustic waves. The method comprises producing a linear acoustic facesheet, including producing an acoustically transparent outer facesheet layer and attaching a layer of linear material to the acoustically transparent outer facesheet layer, wherein the layer of linear material impedes acoustic waves linearly over a range of acoustic wave frequencies and pressure levels. A cellular core may be septumized and sandwiched between the linear acoustic facesheet and an imperforate backsheet.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

DETAILED DESCRIPTION

Figure 1:
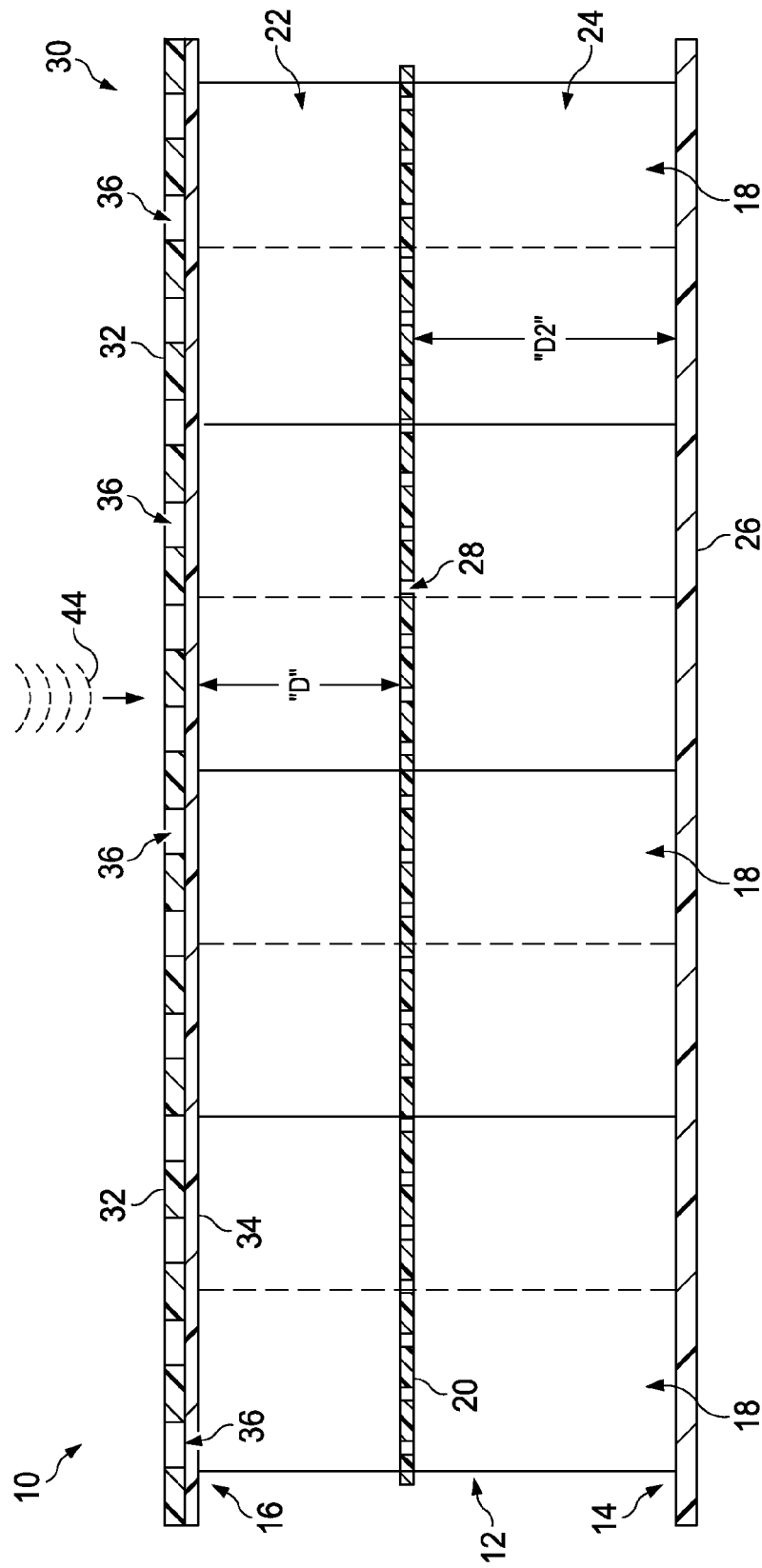
FIG. 1 is a cross-sectional view of one exemplary embodiment of an acoustic panel.

FIG. 1 illustrates one embodiment of an acoustic panel 10 for effectively attenuating sound over a relatively wide range of frequencies and sound pressure levels. One side of the panel 10 is exposed to the sound, hereinafter sometimes referred to as acoustic waves 44. The acoustic panel 10 includes a single layer of cellular hexagonal core 12 (or other type of core to provide a local air column) having a first side 14, a second opposite side 16, and a plurality of individual cells 18 extending therebetween. The sizes of cells 18 can be selected to tune core 12 to acoustic waves having a particular frequency or range of frequencies. For example, and without limitation, the core 12 may be tuned to a frequency range of between approximately 800 Hz and 4,000 Hz. While the cells 18 of the illustrated core 12 have a hexagonal cross-sectional shape, the cells 18 may have other cross-sectional shapes enabling the acoustic panel 10 to attenuate sound and noise over a desired range of frequencies. Moreover, principles of the disclosed embodiments may be employed in a panel construction having separate stacked cores 12 (not shown).

An acoustic septum 20 is disposed within core a desired distance "D" between the first and second sides 14, 16 respectively of the core 12. More specifically, the total panel depth "D" plus "D2" is chosen, and the acoustic septum 20 is located a distance "D" from a later discussed layer 34 of linear material 34 in order to tune the acoustic panel 10 to attenuate acoustic waves over a desired frequency range. The septum 20 divides each of the cells 18 into inner and outer cell chambers 22, 24 respectively. An air impermeable backsheet 26 is attached to and covers the second side 16 of the core 12. The septum 20 may be generally planar and extends substantially parallel to backsheet 26. The septum 20 may comprise a resin, plastic, ceramic, rubber, metal, or any other suitable material, and includes one or more perforations 28 within each of the cells 18. The perforations 28 may be formed in the septum 20 by any suitable technique, such as, for example and without limitation, laser drilling, mechanical drilling or any other necessary or appropriate means. The perforations 28 allow soundwaves to pass through the septum 20 and be reflected off of the backsheet 26 in order to attenuate incoming acoustic waves 44.

A linear acoustic facesheet 30 overlies and is attached to the second side 16 of the core 12. In this example, the linear acoustic facesheet 30 comprises an acoustically transparent, outer facesheet layer 32, and a layer 34 of acoustic linear material sandwiched between the facesheet layer 32 and the core 12. The outer facesheet layer 32 includes perforations 36. The size and number of the perforations 36 is selected such that the outer facesheet layer 32 has a high percentage of open area that renders it substantially transparent to acoustic waves 44 passing through the linear acoustic facesheet 30 into the core 12.

The thicknesses of each of the outer facesheet layer 32 and the linear material layer 34 is selected to tune the acoustic panel 10 to attenuate sound substantially linearly over a desired range of frequencies and sound pressure levels. Additionally, the thickness of the outer facesheet layer 32 should be selected to provide the acoustic facesheet 30 with the strength and rigidity required for the particular application. Generally, the outer facesheet layer 32 is formed with perforations 36 that enable as large an open area as can be tolerated from a strength standpoint so the outer facesheet layer 32 will have a relatively small acoustic effect. For example, the outer facesheet layer 32 may have an open area between about 20% and 50%.

The outer facesheet layer 32 may be formed of any suitable material such as an open weave composite material, or strips of fiber reinforced resin tape, or fibrous metal cloth such as woven wire material or a metal felt material. The linear material layer 34 may be formed of perforate woven or nonwoven material such as, for example and without limitation, a thermoplastic or a metal or a fibrous mesh which provides substantially same the desired degree of resistance to acoustic waves 44 passing through the perforations 36 over a desired range of frequencies and sound the pressure levels. In other words, the linear material layer 34 acoustically responds substantially linearly to acoustic waves (i.e. sound and noise) 44. In some embodiments, the linear material layer 34 may be woven into the outer facesheet layer 32. In some applications where a high degree of structural rigidity is not required, the linear acoustic facesheet 30 may comprise only the linear material layer 34.

The linear acoustic facesheet 30 facilitates removing energy from acoustic waves entering into cells to increase the noise dampening effect produced by septum 20. Linear acoustic facesheet 30 facilitates noise attenuation through viscous losses that occur through the linear material layer 34. The optimum or desired acoustic resistance of linear material layer 34 is generally a function of the flow dynamic, thermodynamic, fluid and material properties.

The acoustic panel 10 may be assembled by any of a variety of techniques, including but not limited to bonding the various layers to one another using a suitable adhesive. The assembly process can be accomplished by welding or brazing the layers together where they are constructed of metal. Alternatively, such metal layers can be attached together by sintering and/or a suitable adhesive.

Figure 2:
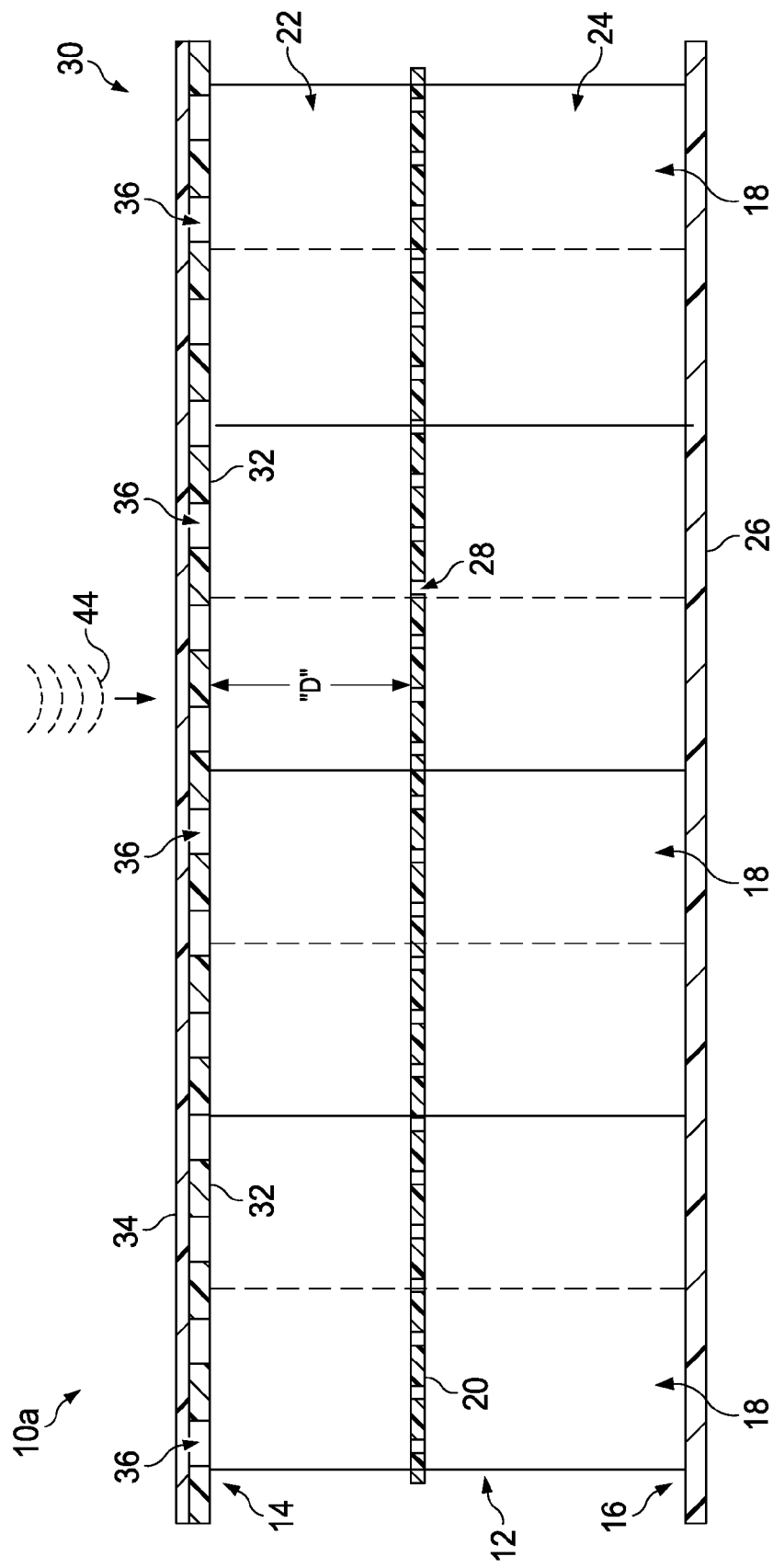
FIG. 2 is a cross-sectional view of another exemplary embodiment of an acoustic panel.

FIG. 2 illustrates an alternate embodiment of the acoustic panel 10a having an alternate form of the linear acoustic facesheet 30. In this embodiment, linear acoustic facesheet 30 comprises a linear material layer 34 that overlies and is bonded to the perforated outer facesheet layer 32, such that the outer facesheet layer 32 is sandwiched between the core 12 and the linear material layer 34. Acoustic waves 44 initially are impeded by but pass through the linear material layer 34 before passing through the perforations 36 in the outer facesheet layer 32.

Figure 3:
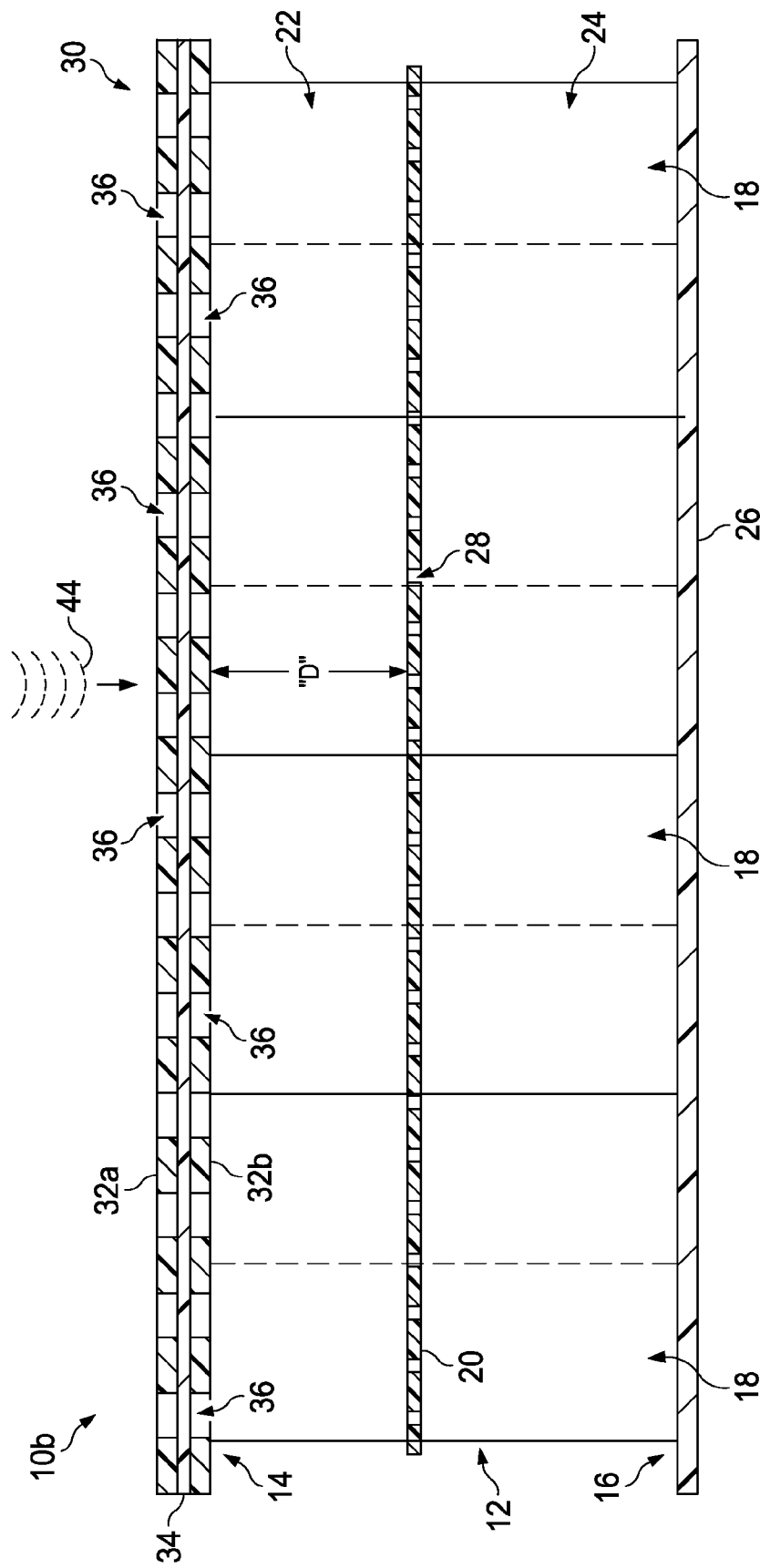
FIG. 3 is a cross-sectional view of a further exemplary embodiment of an acoustic panel.

FIG. 3 illustrates a further alternate embodiment of the acoustic panel 10b. In this example, one or more linear material layers 34 are sandwiched between two outer facesheet layers 32a, 32b. The perforations 36 in the two outer facesheet layers 32a, 32b are aligned such that acoustic waves 44 pass through the aligned perforations 36 and are impeded slightly by the linear material layers 34. As in previous examples, the linear material layer 34 responds substantially in the same way i.e. in a linear manner, to acoustic waves 44 over a desired range of frequencies and sound pressure levels, attenuating the amplitude of the acoustic waves 44 substantially the same amount over the desired bandwidth.

It should be noted here that while the exemplary panel constructions as shown in FIGS. 1-3 each employ a core 12 that is optimized, the principles of the disclosed embodiments, and particularly the linear acoustic facesheet 30, may be employed in panel constructions having cores that are not septumized, i.e. Do not contain a septum 20.

Figure 4:
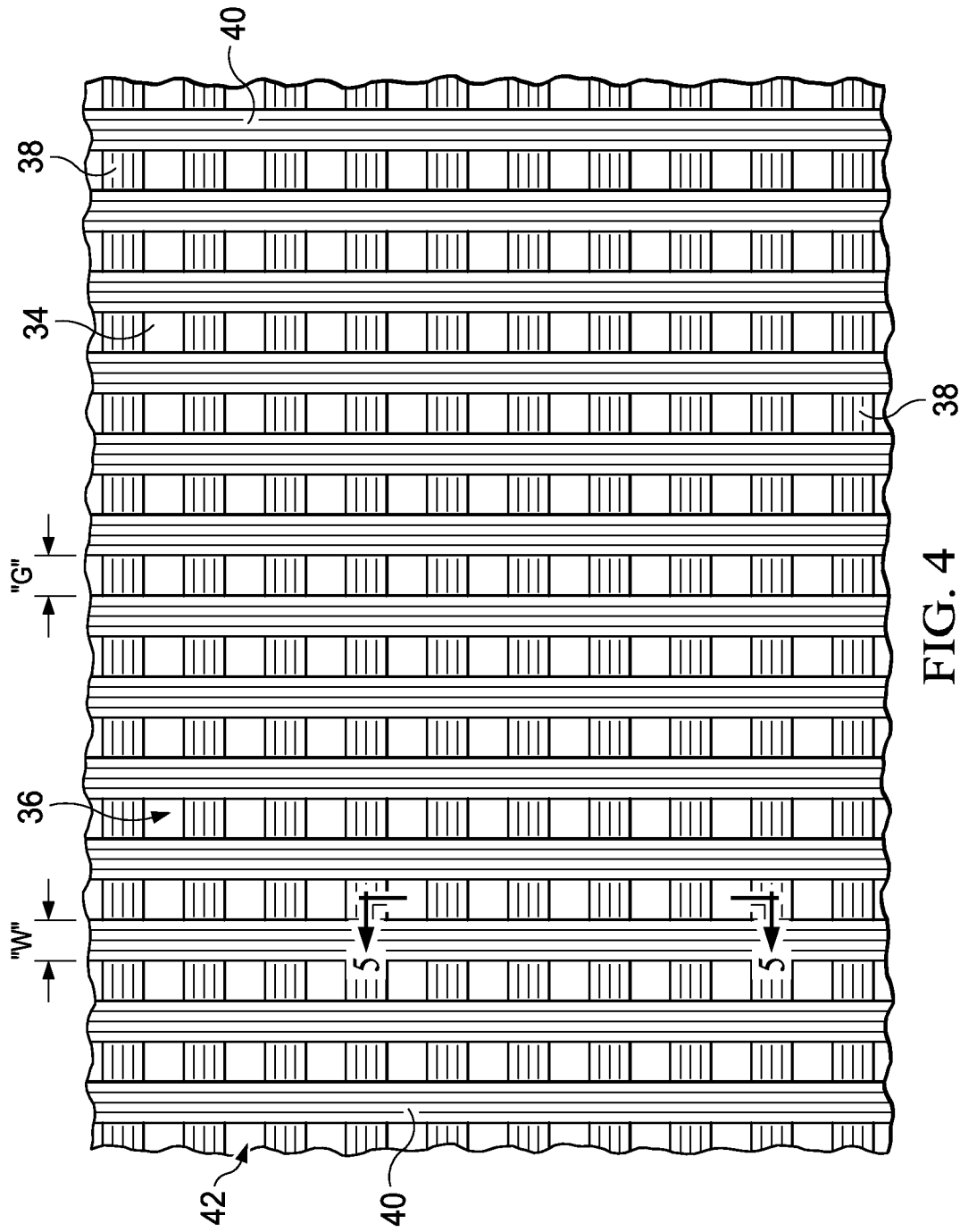
FIG. 4 is a plan view of a portion of a linear acoustic facesheet forming part of the embodiment of the acoustic panel shown in FIG. 3.
Figure 5:
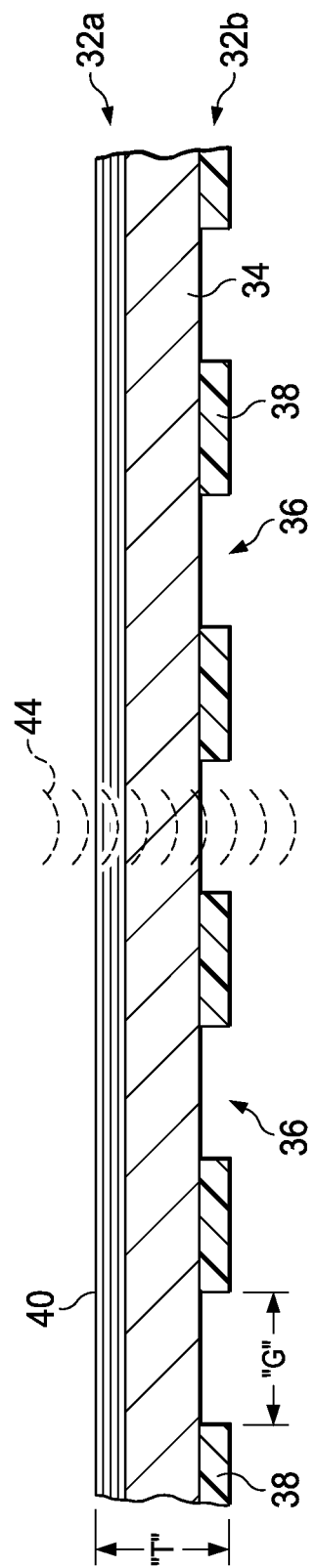
FIG. 5 is a sectional view taken along the line 5-5 in FIG. 4.

Attention is now directed to FIGS. 4 and 5 which illustrate one possible construction of the sandwich type linear acoustic facesheet 30 shown in FIG. 3. One or more linear material layers 34 are sandwiched between two outer facesheet layers 32a, 32b. In this example, each of the outer facesheet layers 32a, 32b comprises a composite material such as a thermoset or thermoplastic resin reinforced with unidirectional fibers. The composite material may take the form of a prepreg tape or slit prepreg tape, sometimes referred to as "tows".

Outer facesheet layer 32a comprises a plurality of composite tape strips 38 having a 0° fiber orientation. The tape strips 38 have a desired width "W" and are spaced apart from each other to form gaps "G" therebetween. Similarly, outer facesheet layer 32b comprises a plurality of composite tape strips 40 having a 90° fiber orientation, which also have a desired width "W" and are spaced apart to form gaps "G". The values for "W" and "G" are chosen to give as high an open area as can be tolerated from a strength standpoint so the outer facesheet layer 32a will have a relatively small acoustic effect. Thus, tape strips 38, 40 extend orthogonal to each other and the gaps "G" form a hole pattern 42 of perforations 36 of the desired area. The area of each of the perforations 36 is determined by the size of the gaps "G", and thus of the distance between the tape strips 38, 40. The tape strips 38, 40 may be laid down and placed using known automated fiber placement equipment (not shown). The linear acoustic facesheet 30 shown in FIGS. 4 and 5 may be laid up and the cured using autoclave or out of autoclave processing.

Figure 6:
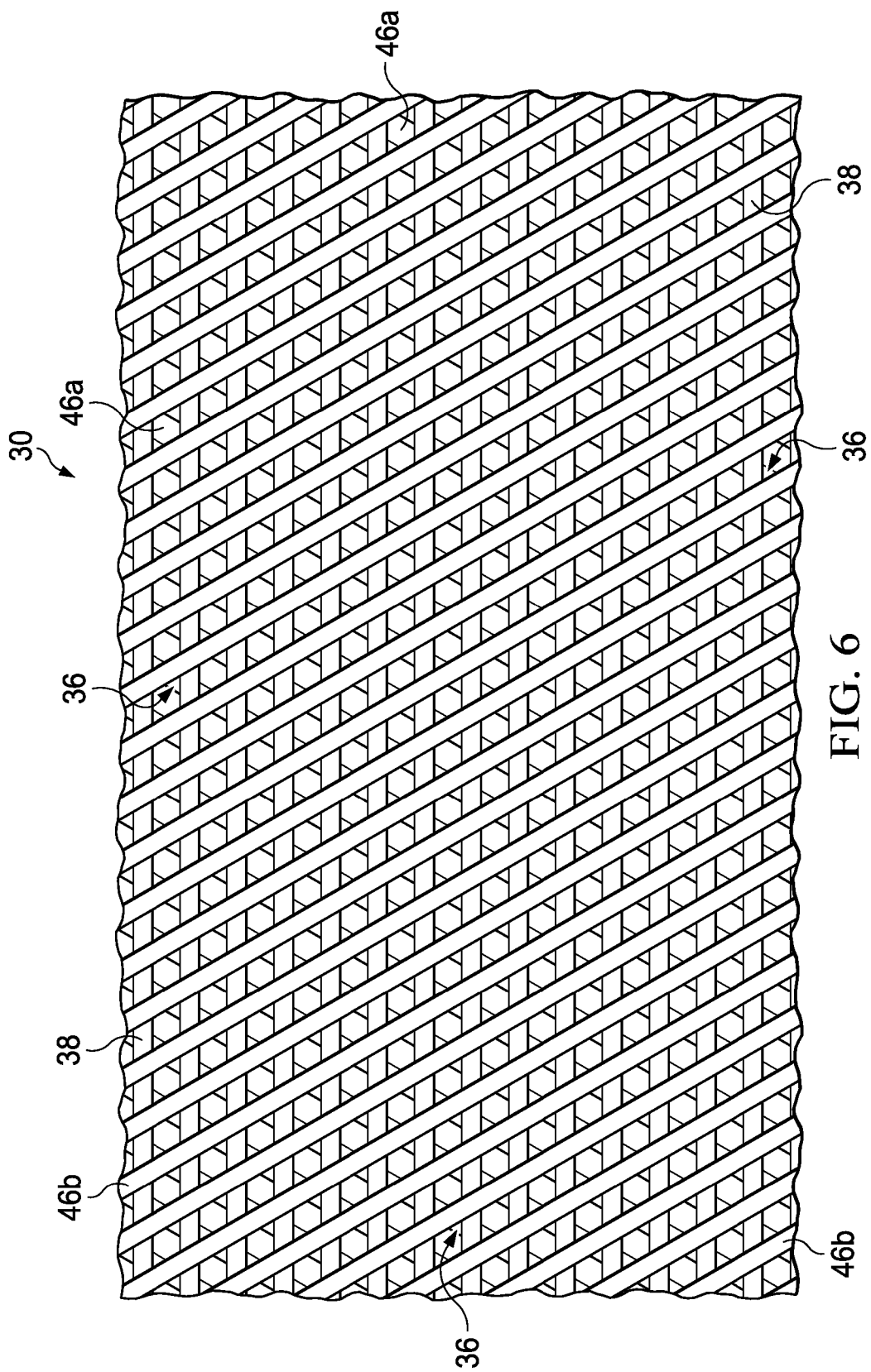
FIG. 6 is a plan view of a portion of an alternate embodiment of the linear acoustic facesheet.
Figure 7:
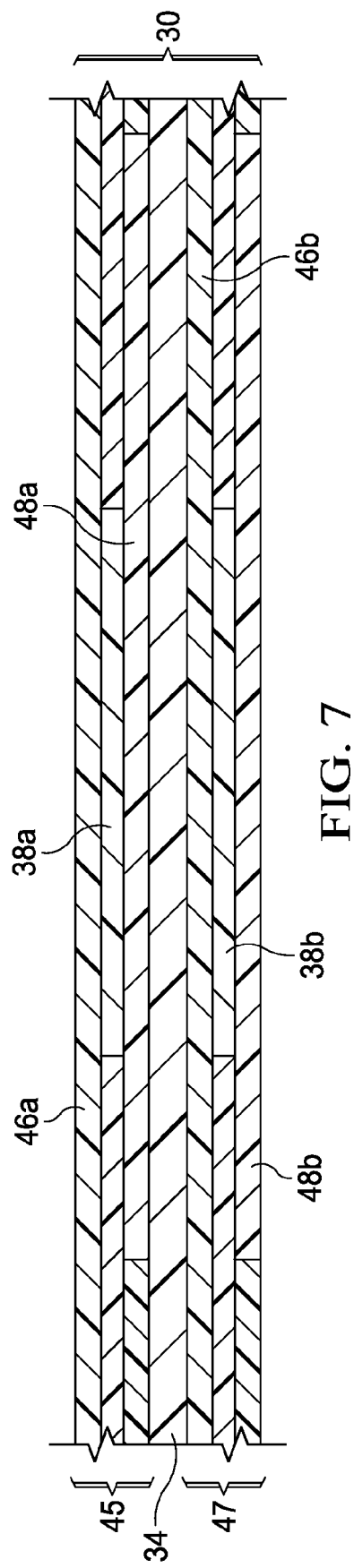
FIG. 7 is a cross-sectional view of a portion of the linear acoustic facesheet shown in FIG. 6.

Attention is now directed to FIGS. 6 and 7 which illustrate another embodiment of a linear acoustic facesheet 30 formed by composite tape strips, and one or more layers of a linear material. In this exemplary embodiment, one or more linear material layers 34 of the type previously described are sandwiched between multiple, acoustically transparent, laminated plies of composite material, each comprising unidirectional prepreg tape strips of a desired fiber orientation. More particularly, the linear material layer 34 is sandwiched between two laminated groups 45, 47 of plies, wherein which each ply group 45, 47 comprises a combination of composite tape strips formed of fiber reinforced thermoplastic or thermoset resin. For example, the laminated ply group 45 comprises spaced composite tape strips 38a, 46a, 48a respectively having 0°, −60° and +60° fiber orientations. Similarly, ply group 47 comprises spaced apart composite tape strips 38b, 46b and 48b respectively having 0°, −60°, and +60° fiber orientations. Other fiber orientations are possible, and each ply group 45, 47 may have more or less than three plies.

The tape strips in the ply groups 45, 47 are arranged and aligned to form perforations 36 of a desired size and shape that collectively yield a desired open area. For example, in one embodiment, the total open the area formed of by the perforations 36 may be between 40 and 50%. It should be noted here that while the linear acoustic facesheet construction shown in FIGS. 6 and 7 that is used to form the linear acoustic facesheet in the acoustic panel shown in FIG. 3, a similar construction employing composite tape strips of varying fiber orientations to form one or more outer facesheet layers 32 may be employed in the acoustic panel 10 shown in FIG. 1 and the acoustic panel 10a shown in FIG. 2.

From the foregoing, it may be appreciated that the disclosed embodiments provide a simple, low-cost and effective method of fabricating an acoustic panel 10 for attenuating acoustic waves 44. The method broadly comprises, as previously discussed, producing a linear acoustic facesheet 30, septumizing a cellular core 12, and sandwiching the septumized cellular core 12 between the linear acoustic facesheet 30 and an imperforate backsheet 26. Producing the linear acoustic facesheet 30 includes producing an acoustically transparent outer facesheet layer 32, and attaching a layer 34 of the linear material to an acoustically transparent outer facesheet layer 32. The layer 34 linear material impedes the acoustic waves linearly over a range of acoustic wave frequencies.

Figure 8:
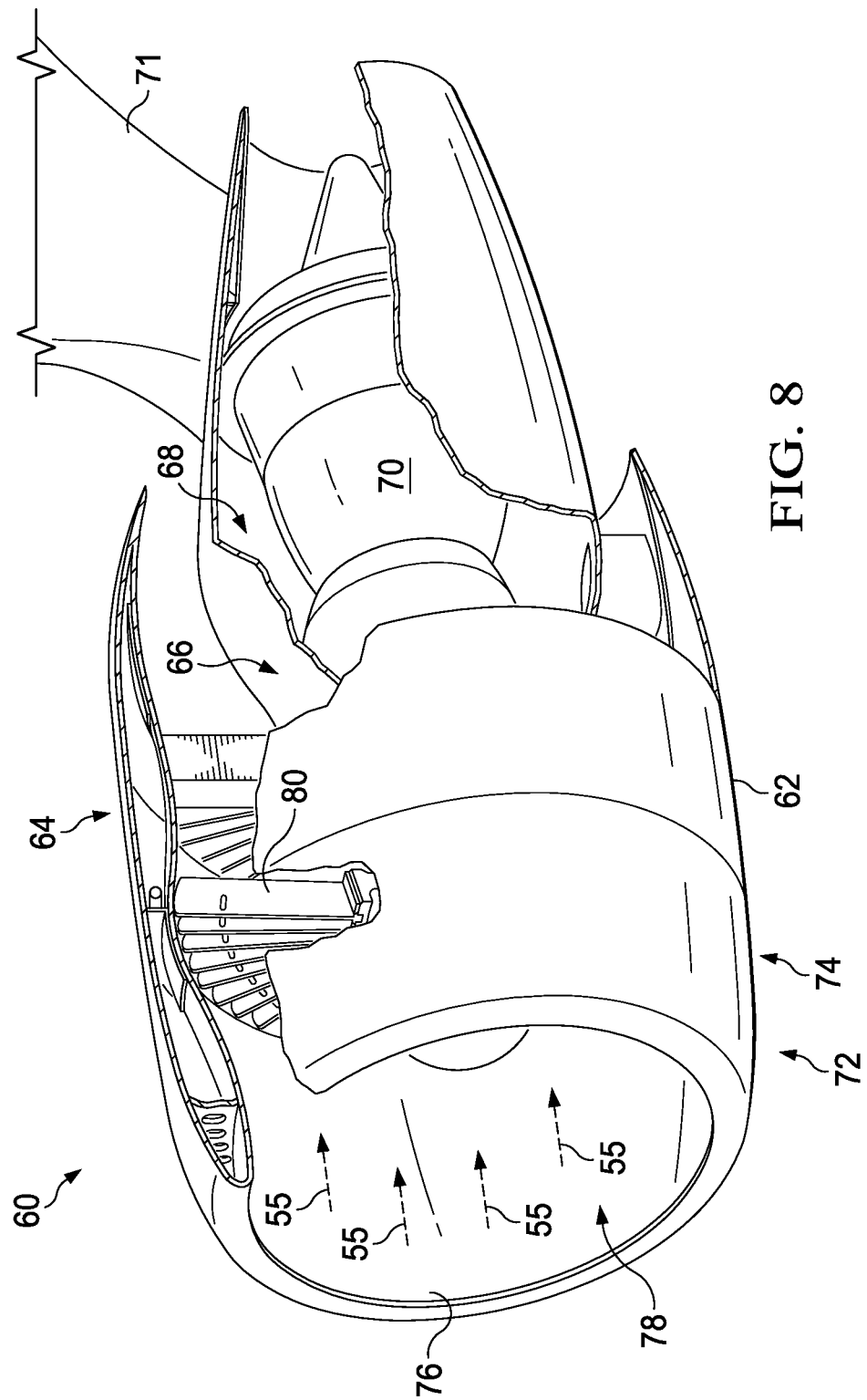
FIG. 8 is a perspective view of an aircraft engine, portions broken away in section to show internal components of the engine.

FIG. 8 is a schematic view of an exemplary aircraft engine 60 that may include acoustic panels 10. Engine 60 includes a nacelle 62 that generally includes a fan section 64, a compressor section 66, a combustion section 68, and a turbine section 70. Engine 60 is typically attached to the wings, fuselage, or tail of an aircraft through appropriate mountings, for example, a pylon 71. Nacelle 62 includes a forward extension 72 having an outer wall 74 and an inner wall or air inlet lining 76. In the exemplary implementation, acoustic panels 10 are arranged to form at least a portion of inner wall 76 such that linear acoustic facesheet defines an air intake duct 78 for combustion section 68. Acoustic panel 10 facilitates reducing noise created by the high speed flow of air passing through intake duct 78 and into combustion section 68, as well as to reduce noise generated by a plurality of fan blades 80 of fan section 64. Alternatively, or in addition, the acoustic panel 10 may be used on any surface portion of engine 60 in order to facilitate noise reduction. Further, it will be appreciated that the acoustic panel 10 may be used for reducing noise in various other engines or applications.

In use, air flows 55 into intake duct 78 and sound enters cells 18 of core 12 through the linear acoustic facesheet 30. The linear acoustic facesheet 30 impedes the air pushed into cells 18 by the sound waves, and septum 20 dampens the sound waves entering cells 18. The sound reflects off of backsheet 26 at a different phase than the sound waves entering cells 18 and facilitates canceling out the incoming waves, thus reducing the noise produced by engine 60.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An acoustic panel for attenuation of acoustic waves for an aircraft engine intake, comprising:
   a core having first and second sides and a plurality of cells extending between the first and second sides;
   an air-impermeable backsheet on the first side of the core; and
   a linear acoustic facesheet on the second side of the core, including a layer of linear material that responds substantially the same to the acoustic waves over a range of acoustic wave frequencies and pressure levels;
   wherein the linear acoustic facesheet includes an outer facesheet layer that is substantially transparent to the acoustic waves.

2. The acoustic panel of claim 1, further comprising:
   a septum within the core between said first and second sides of the core;
   wherein the layer of linear material is a woven fabric.

3. The acoustic panel of claim 2, wherein layers of linear material is woven into the outer facesheet layer.

4. The acoustic panel of claim 2, wherein the outer facesheet layer includes perforations therein forming an open area in the outer facesheet layer of between approximately 40% to 50%.

5. The acoustic panel of claim 2, wherein the layer of linear material is sandwiched between the outer facesheet layer and the second side of the core.

6. The acoustic panel of claim 2, wherein the outer facesheet layer is sandwiched between the layer of linear material and the second side of the core.

7. The acoustic panel of claim 2, wherein the outer facesheet layer comprises a plurality of spaced apart strips of unidirectional fiber reinforced resin having differing fiber orientations.

8. The acoustic panel of claim 2, wherein the outer facesheet layer comprises a plurality of laminated plies composite material, each of the plies comprising spaced apart strips of fiber reinforced composite tape.

9. The acoustic panel of claim 8, wherein the plies having differing fiber orientations and are arranged to form perforations extending through the outer facesheet layer.

10. An acoustic liner for an aircraft engine intake, comprising:
    a cellular core having a first side and a second side;
    a backsheet covering the first side of the cellular core; and
    a linear acoustic facesheet covering the second side of the cellular core and exposed to acoustic waves within the engine intake, the linear acoustic facesheet including a layer of linear material that impedes acoustic waves entering the cellular core substantially linearly over a range of acoustic wave frequencies and pressure levels;
    wherein the linear acoustic facesheet includes a substantially acoustically transparent outer facesheet layer.

11. The acoustic liner of claim 10, further comprising a septum within the cellular core spaced from the linear acoustic facesheet and dividing the cellular core into first and second cellular chambers.

12. The acoustic panel of claim 10, wherein
    the layer of linear material is woven into the acoustically transparent outer facesheet layer.

13. The acoustic panel of claim 10, wherein the linear acoustic facesheet includes an outer facesheet layer formed of by at least two perforated plies of composite material.

14. The acoustic panel of claim 13, wherein each of the perforated plies includes a plurality of spaced apart strips of fiber reinforced resin.

15. The acoustic panel of claim 14, wherein the perforated plies having differing fiber orientations.

16. The acoustic panel of claim 14, wherein the fiber orientations of the at least two perforated plies are substantially orthogonal.

17. The acoustic panel of claim 14, wherein the perforated plies include fiber orientations including 0°, +60° and −60°.

18. The acoustic panel of claim 14, wherein the layer of linear material is sandwiched between the at least two plies.

19. A method of fabricating an acoustic panel for attenuating acoustic waves for an aircraft engine intake, comprising:
    producing a linear acoustic facesheet, including producing an acoustically transparent outer facesheet layer and attaching a layer of linear material to an acoustically transparent outer facesheet layer, wherein the layer of linear material impedes acoustic waves linearly over a range of acoustic wave frequencies and a pressure levels;
    providing a cellular core; and
    sandwiching the cellular core between the linear acoustic facesheet and an imperforate backsheet;
    wherein, the linear acoustic facesheet includes an outer facesheet layer that is substantially transparent to the acoustic waves.

20. The method of claim 19, further comprising:
    septumizing the cellular core.

21. The method of claim 19 wherein producing the acoustically transparent outer facesheet layer includes:
    laying up a plurality of plies of composite material, including laying down strips of fiber reinforced resin tape having differing fiber orientations and spacing the strips of fiber reinforced resin tape apart from each other.

* * * * *